US005240596A

United States Patent [19]

Chesnut

[11] Patent Number: 5,240,596

[45] Date of Patent: Aug. 31, 1993

[54] AQUARIUM CLEANING APPARATUS

[75] Inventor: M. Gaines Chesnut, Golden, Colo.

[73] Assignee: Chesco, Inc., Wheatridge, Colo.

[21] Appl. No.: 743,246

[22] Filed: Aug. 9, 1991

[51] Int. Cl.[5] ............ A01K 63/04

[52] U.S. Cl. ............ 210/136; 210/137; 210/169; 210/416.2; 119/232; 15/1.7

[58] Field of Search ............ 210/169, 416.2, 136, 210/137; 119/5; 15/1.7

[56] References Cited

U.S. PATENT DOCUMENTS

| | | | |
|---|---|---|---|
| D. 282,016 | 12/1985 | Chestnut | D30/12 |
| 2,899,063 | 8/1959 | Ellis, Jr. | 210/169 |
| 2,956,507 | 10/1960 | Hutchinson | 210/169 |
| 4,571,766 | 2/1986 | Goldman et al. | 15/105 |
| 4,610,784 | 9/1986 | Reyniers | 210/169 |

*Primary Examiner*—Peter A. Hruskoci
*Assistant Examiner*—Robert James Popovics
*Attorney, Agent, or Firm*—Sheridan Ross & McIntosh

[57] ABSTRACT

An aquarium cleaning apparatus is described that preferably incorporates a number of features including: (1) a swivel head connected to the siphon hose which rotates as the apparatus is maneuvered around an aquarium; (2) extension tubes to lengthen the cleaning tube assembly so that the apparatus can be used, for example, in aquariums having a greater height; (3) a self-starting feature that has a novel two-piece check ball assembly which permits "self-starting" of the siphon action; (4) an angled spout on the swivel head which connects to the siphon hose to facilitate self-starting; (5) an angled corner on the cleaning tube assembly which permits the apparatus to access and effectively clean the gravel adjacent to the walls and corners of the aquarium; (6) an aesthetically attractive contoured gripping tube; (7) a screen which prevents aquarium gravel from jamming the check valve assembly; and (8) a scraper assembly and scrubber assembly which may be attached to the apparatus for removing deposits to accumulate upon the interior surface of an aquarium.

15 Claims, 16 Drawing Sheets

AQUARIUM CLEANING APPARATUS

FIELD OF THE INVENTION

The present invention relates generally to aquarium cleaning devices, and, more particularly, to a self-starting gravel cleaning apparatus with attachments to remove materials deposited on interior aquarium surfaces.

BACKGROUND OF THE INVENTION

Fish aquariums are becoming increasingly popular for both home and office use. Aquariums typically include a pump and filter arrangement to remove fish waste, uneaten food and other impurities from the aquarium water and, for aesthetic purposes, a layer of gravel on the bottom of the aquarium. Despite improvements and advances in the field of aquarium filtering systems, a quantity of fish waste and other aquarium sediments typically accumulates along the bottom of the aquarium and adheres to the gravel. This accumulation of waste and other sediments not only provides an unsightly and undesirable appearance but also endangers aquatic life.

An increasingly preferred method to clean aquarium gravel is to employ a suction or siphon device. U.S. Pat. No. 282,016, by Chesnut, issued Dec. 31, 1985, discloses a design for an aquarium gravel cleaner used to siphon sediments from gravel. The cleaner consists of a cleaning tube, a check valve assembly to self-start and regulate the siphon process, an angled siphon hose junction, and a siphon hose. The siphon hose discharges into a container such as a bucket. Such devices remove not only sediments from gravel but also a portion of the water from the aquarium, simplifying the important task of periodically changing a portion of the aquarium water. Without gravel cleaning and water changes, the nitrogen cycle (the conversion of ammonia to nitrite and nitrite to nitrate) will cease to function properly, causing toxic water conditions.

U.S. Pat. No. 4,610,784, by Reyniers, issued Sep. 9, 1986 discloses an aquarium cleaning device consisting of a gravel tube connected to an elongated flexible hose which is in turn connected to a faucet pump mounted on a water faucet. When the water faucet is turned on, the faucet pump causes water from the aquarium to be drawn through the gravel tube and the elongated flexible hose and discharged into the sink. The rate of flow of the water through the gravel tube and flexible hose is controlled by a manually operated butterfly valve. When the desired amount of sediment is removed from the aquarium gravel, the faucet pump may be disengaged to cause a reverse flow of water from the water faucet to the aquarium to refill the aquarium tank.

Prior art aquarium gravel cleaning devices have several drawbacks. First, many prior art aquarium gravel cleaning devices typically require the user to immerse his hands in the aquarium water to operate the device. The presence of aquarium water on the user's hands is not only uncomfortable and annoying but also unsanitary. Second, no prior art aquarium gravel cleaning devices are designed to permit the efficient removal of sediments from gravel adjacent to aquarium walls and corners or aquarium decorations. Prior art devices typically have circular configurations which are not compatible with straight aquarium walls and corners and many aquarium decorations. Third, aquarium gravel cleaning devices must often be restarted repeatedly during use as a result of siphon stoppages or impediments caused by a variety of factors including the kinking or pinching of the siphon hose as the device is maneuvered around the aquarium and the removal of excess amounts of water from the aquarium. Fourth, the self-starting mechanisms used one-piece spherical plastic check balls which were often unable to form a water-tight seal with the check ball seat. In molding the check balls parting lines or ridges would form on the exterior surface of the ball destroying the integrity of the seal. Because the balls are spherical, the balls could not be prevented from rotating such that the parting line would contact the check ball seat. The typical process to remove the parting line is an expensive tumbling process which substantially increases the cost to manufacture the check ball. The integrity of the seal is also disrupted by warpage or other irregularities in the spherical shape of the check ball caused by entrapment of air bubbles in the ball and unequal cooling rates of the plastic in different parts of the ball. For example, the plastic in the center of the ball is generally at a higher temperature than the plastic located in other parts of the ball and therefore cools more slowly, causing surface irregularities.

Gravel is not the only part of the aquarium that requires periodic cleaning. The interior surfaces of the aquarium typically become encrusted with a variety of substances including algae and various chemical deposits. An aquarium may have different types of surface deposits at different locations on the tank.

U.S. Pat. No. 4,571,766, by Goldman, et al., issued Feb. 25, 1986, discloses a cleaning device permitting the interchange or replacement of cleaning elements to clean the various types of deposits that occur on interior aquarium surfaces. The device includes an elongated handle, a non-rusting glass scraper, and rigid projections from the head piece to hold the cleaning material in position during use. The cleaning material can be any non-rusting, non-corrosive material of sufficient strength to withstand the force generated while the aquarium surface is scrubbed.

No prior art aquarium cleaning device cleans both aquarium gravel and interior surfaces. Prior art aquarium cleaners are designed either for the cleaning of aquarium gravel or surfaces but not both. With such devices, the user typically first cleans the interior surfaces of the aquarium which causes materials deposited on the surfaces to cloud the aquarium water. This task is complicated by the tendency of the handles of such cleaning devices to bend or break when they encounter tough surface deposits. After the surfaces are cleaned, the user employs a second aquarium cleaning device to clean the gravel and remove the materials clouding the aquarium water surface. By this time, a significant amount of the surface materials has settled onto the aquarium gravel and decorations complicating the cleaning process.

SUMMARY OF THE INVENTION

The present invention is an aquarium cleaning apparatus for removing fish waste and other sediments from aquarium gravel and a variety of deposits from the interior surface of an aquarium. A number of advantageous features are integrated into a single aquarium cleaning apparatus. First, the apparatus has a swivel head connected to the siphon hose which rotates as the apparatus is maneuvered around an aquarium, thereby preventing flow stoppages or impediments caused by kinking or pinching of the siphon hose. Second, the apparatus includes extension tubes to lengthen the cleaning tube assembly so that the apparatus can be used, for example, in aquariums having a greater height. Third, the apparatus includes a self-starting feature that has a novel two-piece check ball assembly which permits "self-starting" of the siphon action of the apparatus without requiring the user to immerse his hands in the aquarium water or risk ingestion of aquarium water. Fourth, the apparatus includes on the swivel head an angled spout which connects to the siphon hose to facilitate self-starting of the apparatus and prevent kinking or pinching of the siphon hose. Fifth, the apparatus includes an angled corner on the cleaning tube assembly which permits the apparatus to access and effectively clean the gravel adjacent to the walls and corners of the aquarium. Sixth, the apparatus includes a contoured gripping tube, which not only is aesthetically attractive but also improves the user's ability to grip the apparatus during operation. Seventh, the apparatus includes a screen which prevents aquarium gravel from jamming the check valve assembly and smaller fish from being sucked into the apparatus. Finally, the apparatus, preferably, includes a scraper assembly and scrubber assembly which may be attached to the apparatus for removing deposits which accumulate upon the interior surface of an aquarium. A preferred embodiment of the present invention includes a fluid control assembly which may be used to control the rate of flow of aquarium water as it is siphoned from the aquarium. The fluid control assembly enables the user to adjust the flow rate to match the size and weight of aquarium gravel and prevent the unnecessary discharge of aquarium water while the apparatus is maneuvered around obstacles in the aquarium. In addition, with correct manipulation, the fluid control assembly can be used to relocate gravel. A preferred embodiment of the present invention also includes a hydraulic ramp which improves flow dynamics and thereby facilitates self-starting of the apparatus.

DETAILED DESCRIPTION

The present invention relates to an aquarium cleaning apparatus for removing fish waste, uneaten food and other sediments from aquarium gravel and deposits from the interior surface of an aquarium. The apparatus removes undesirable materials from the aquarium through a siphon action. As used herein, "siphon" refers to the movement of a liquid caused by the force of atmospheric pressure upon the surface of the liquid.

Figure 1:
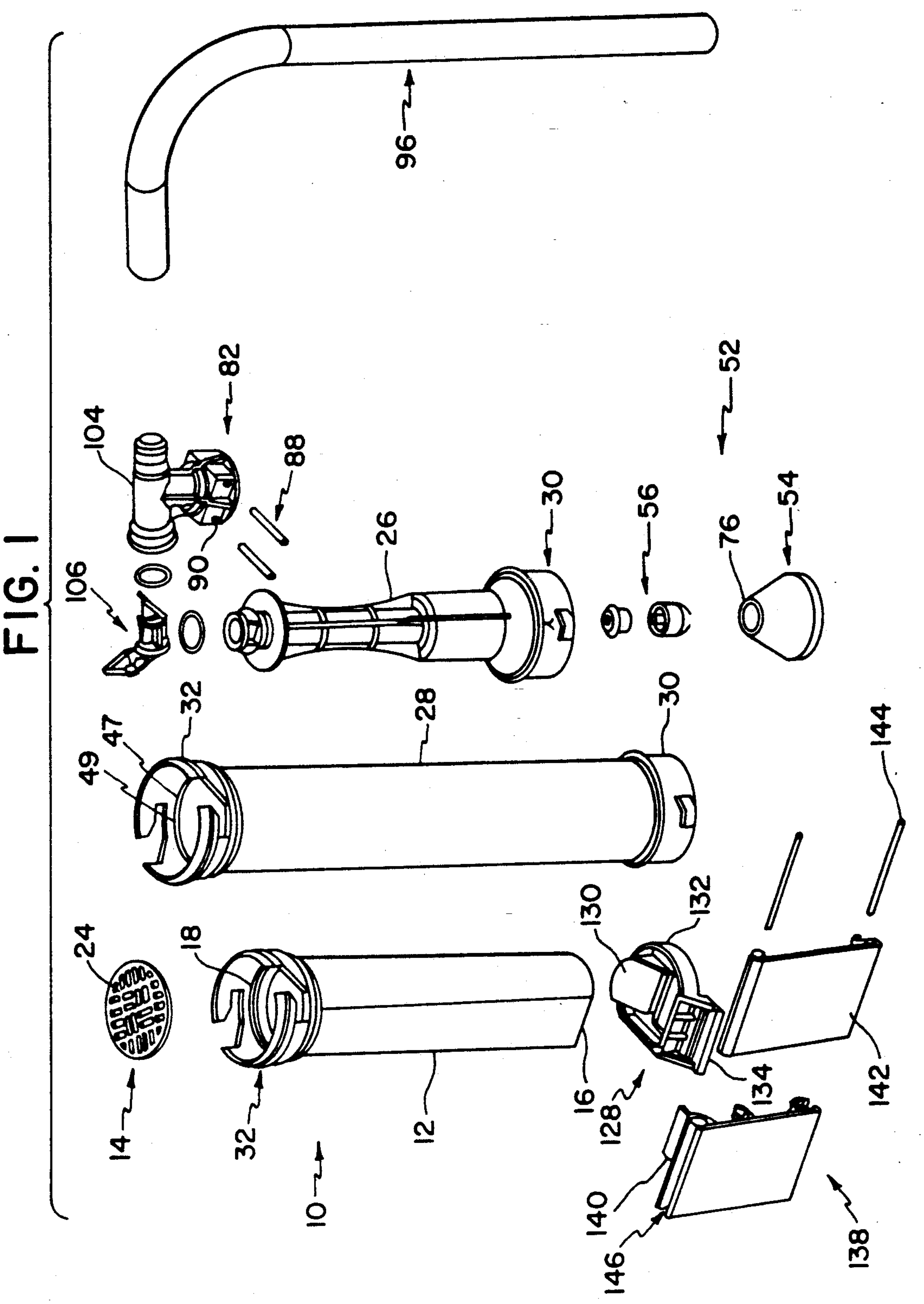
FIG. 1 is an exploded view of the aquarium cleaning apparatus illustrating the component parts of the present invention.
Figure 2:
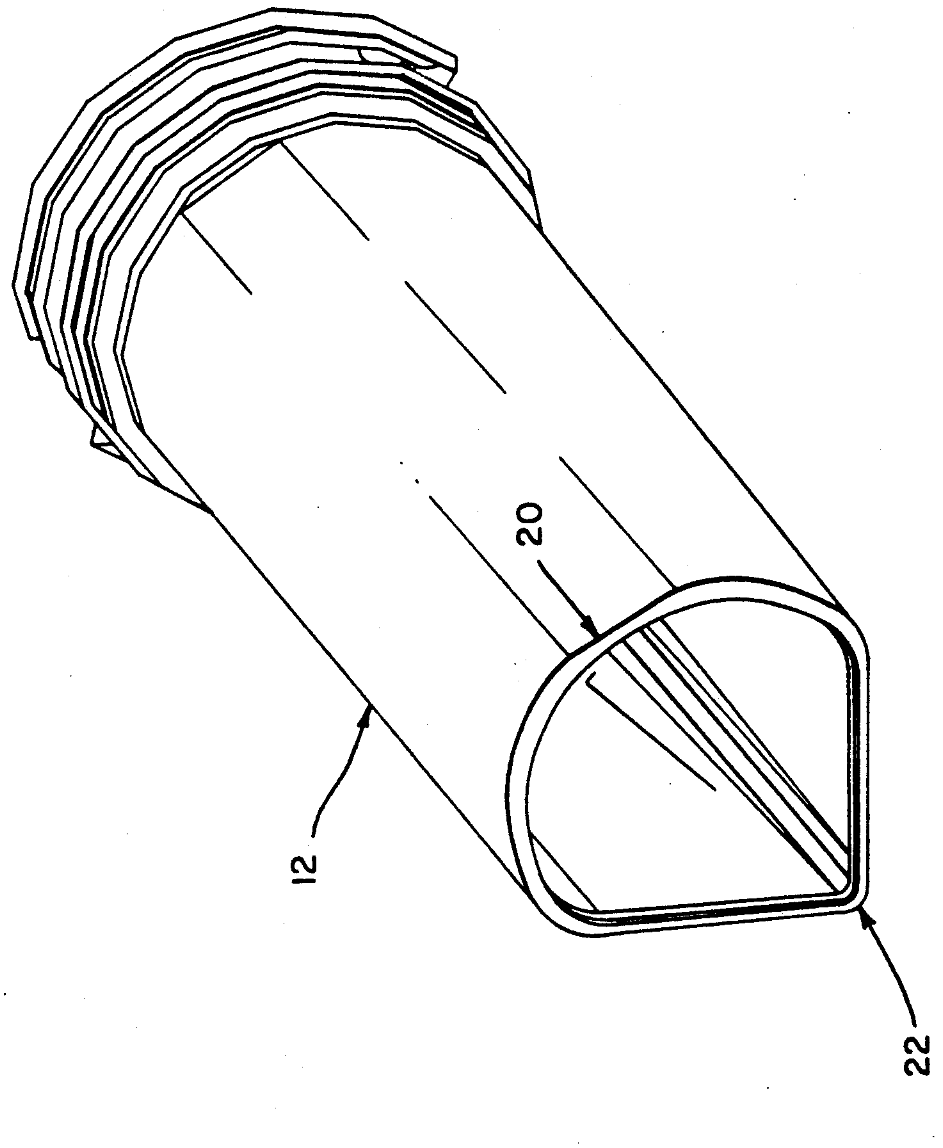
FIG. 2 is an isometric view of the base of the cleaning tube assembly showing the angled corner used for cleaning gravel adjacent to aquarium walls and corners.
Figure 4:
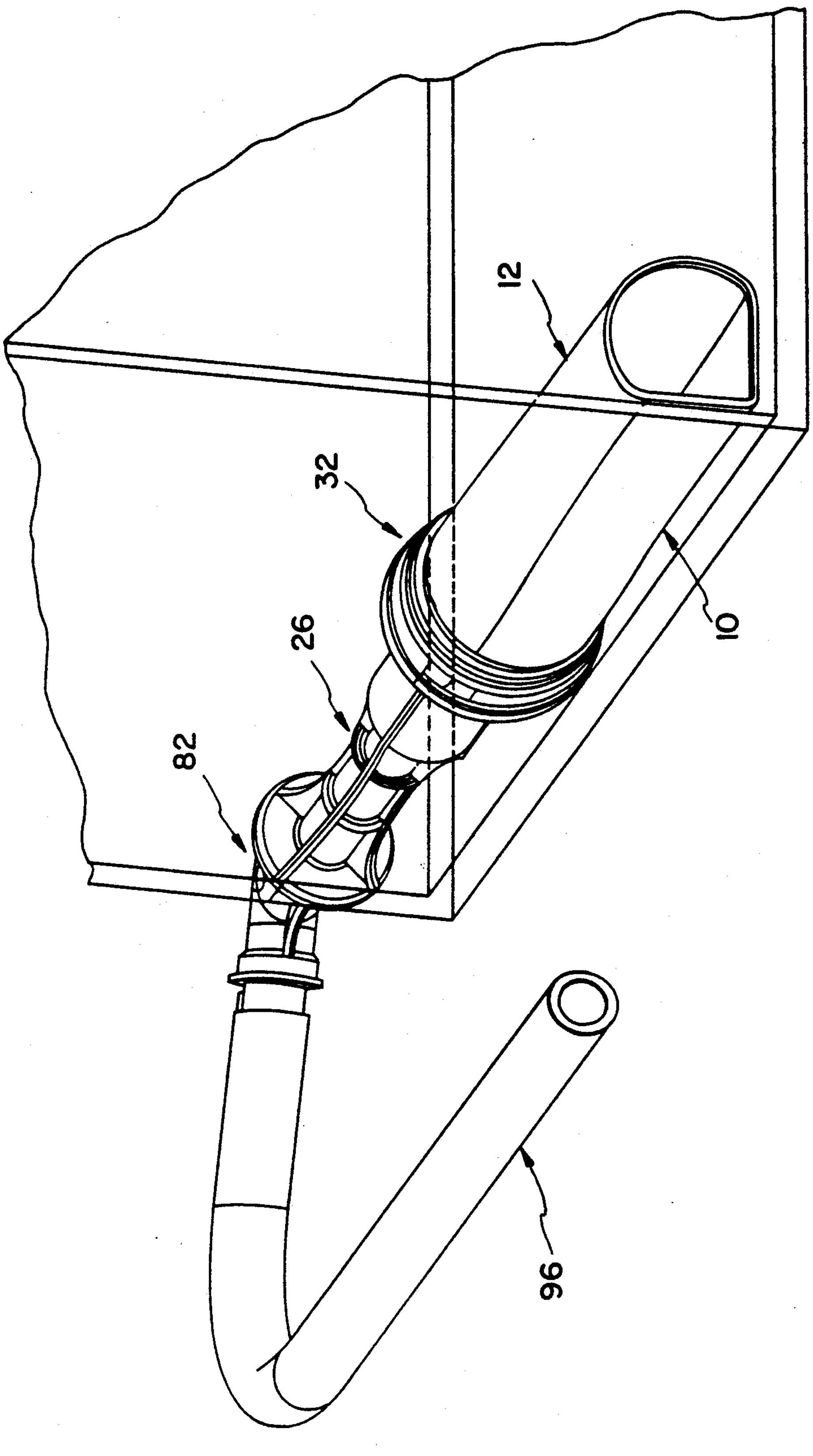
FIG. 4 is an isometric view of the base of the cleaning tube assembly showing the use of the cleaning tube assembly to clean gravel adjacent to the corner of an aquarium.
Figure 10:
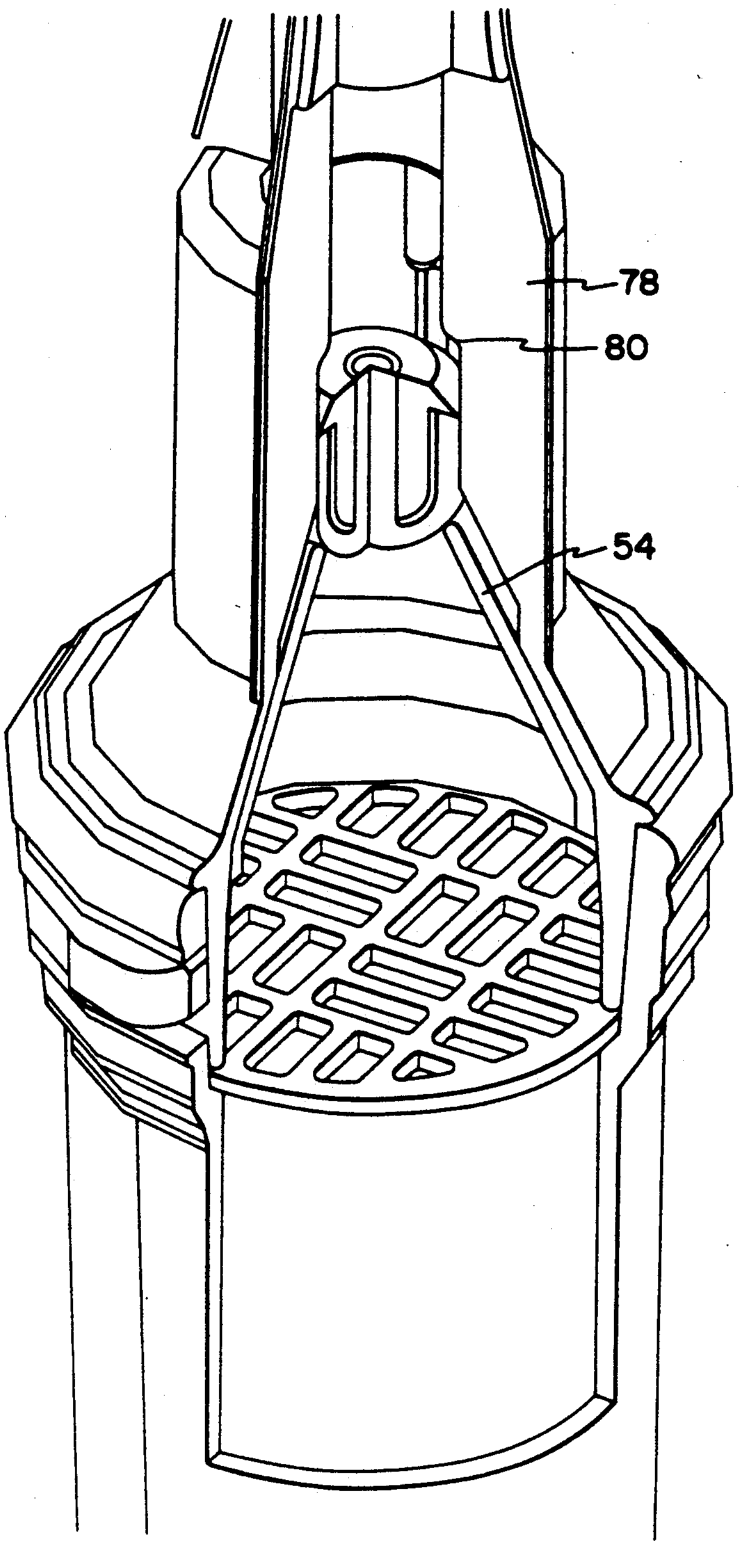
FIG. 10 is a cross-sectional view of the upper portion of the cleaning tube assembly, the lower portion of the contoured gripping tube, and the check valve assembly showing the check ball assembly in a closed position and the screen.

Referring to FIGS. 1 and 2, a cleaning tube assembly 10 includes a cleaning tube 12 and a screen 14. The cleaning tube 12 has an entrance port or free end 16 and an exit port 18. The entrance port 16 has a semi-circular section 20 and an angled section- 22. The angled section 22 has two planar surfaces or sides **23*a*, 23*b* which intersect at about a 90° angle for cleaning gravel adjacent to aquarium walls and corners in most aquarium tank configurations including rectangular, hexangular, and octagonal tanks. At the free end 16, the planar surfaces 23*a*, 23*b* terminate in substantially straight legs 25*a*, 25*b*, respectively. The juncture of the planar surface 23*a*, together with its leg 25*a*, and the planar surface 23*b*, with its leg 25*b*, defines a substantially straight edge 27. As seen in FIG. 4, the straight edge 27 is substantially parallel to a corner of adjoining walls of the aquarium, with the planar surfaces 25*a*, 25*b* being substantially parallel to the adjoining walls during the cleaning of the aquarium and the substantially straight edge 27 being located at this juncture to clean gravel adjacent to aquarium walls and corners. As seen in FIG. 10, the screen 14 is held in the single cleaning tube 12 and has screen holes 24, which are permeable to the passage of aquarium water and other fine particulates but are substantially impermeable to the passage of most size fractions of aquarium gravel. That is, water and fine particulates move in one direction, from the entrance port 16 to the exit port 18 during the siphoning operation. The screen 14** also prevents smaller fish from being sucked into the aquarium cleaning apparatus.

Figure 5:
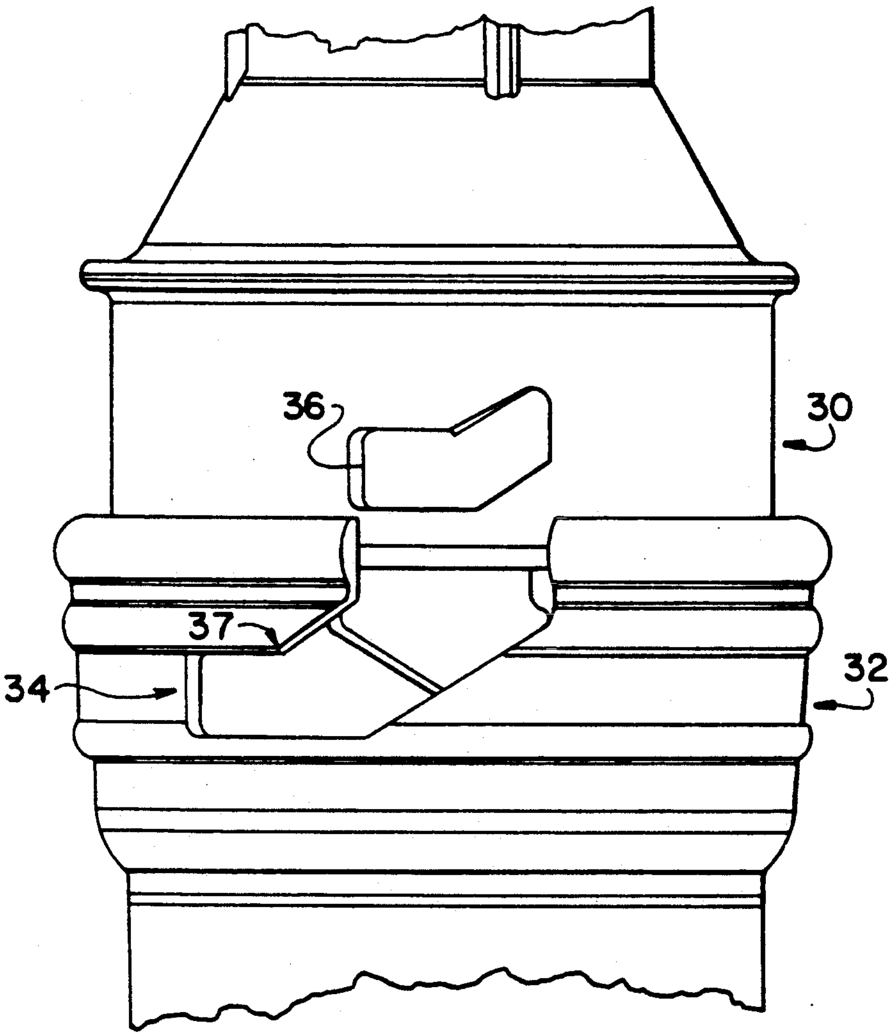
FIG. 5 is a side view of the neck and collar showing an angled locking tab and matching angled slot.
Figure 6:
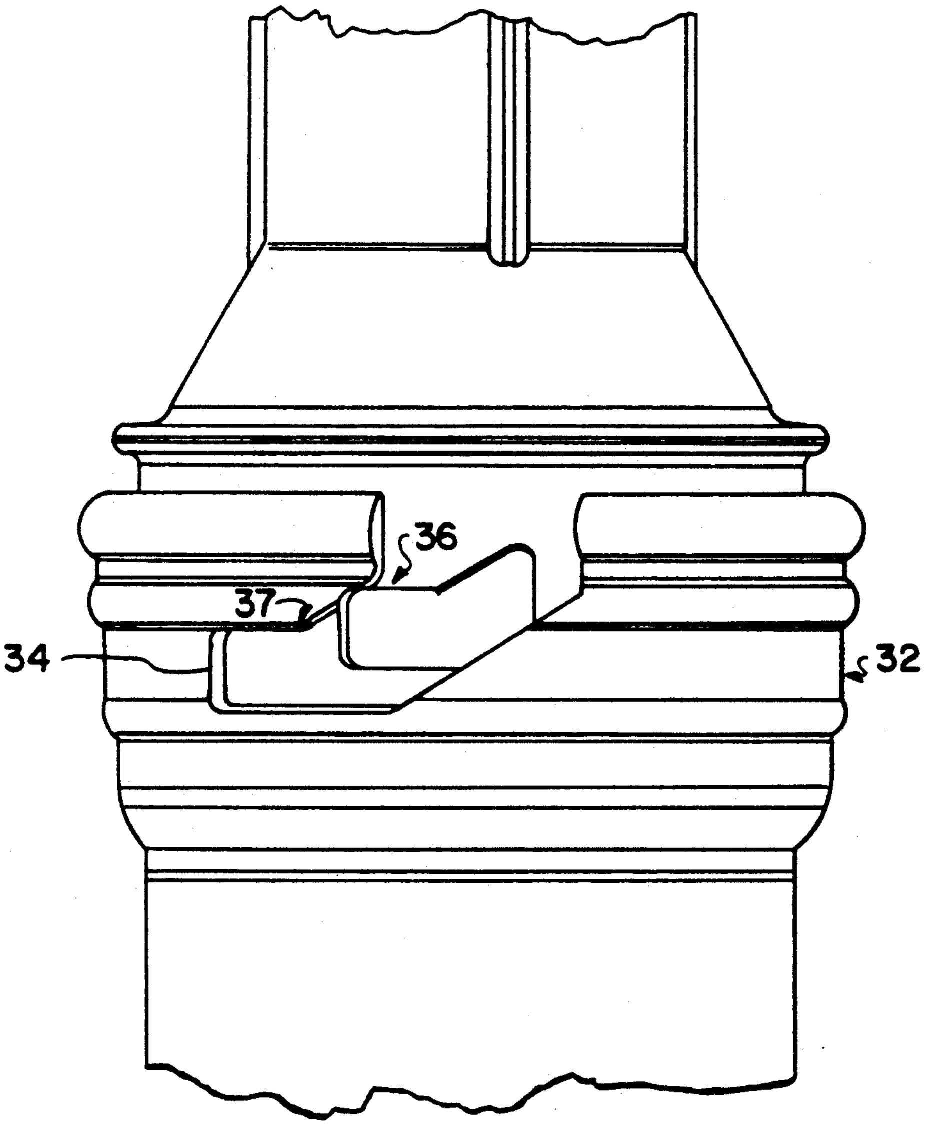
FIG. 6 is a side view of the neck and collar showing the angled locking tab partially inserted into the matching angled slot.
Figure 7:
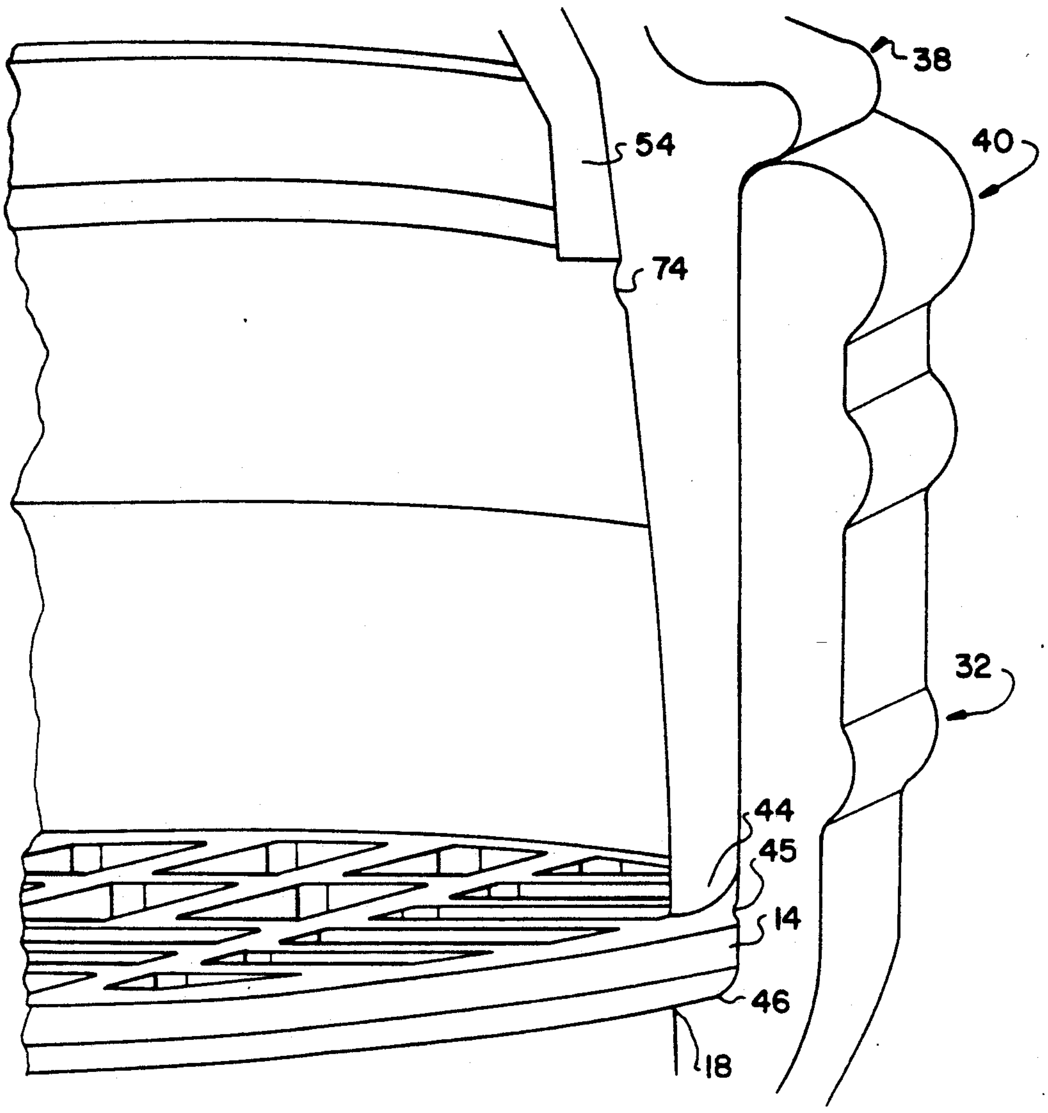
FIG. 7 is a cross-sectional view of the collar of the cleaning tube and the neck of the contoured gripping tube showing the screen, screen seat and screen snap-fit ring.
Figure 8:
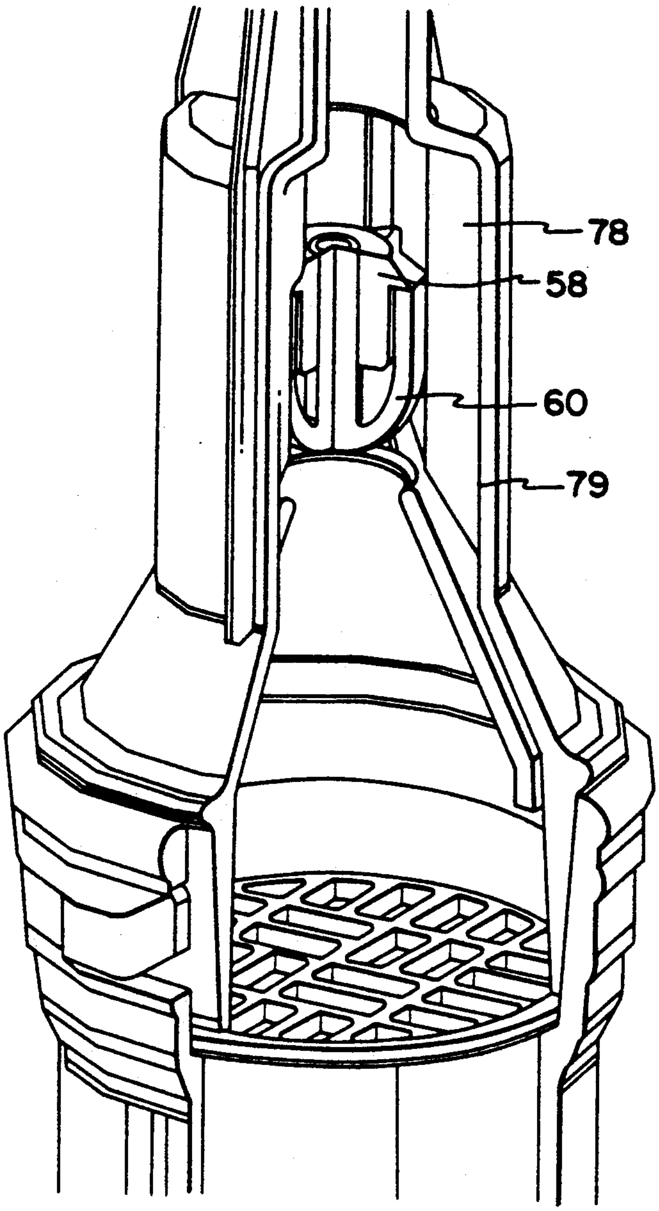
FIG. 8 is a cross-sectional view of the upper cleaning tube assembly, lower contoured gripping tube, and check valve assembly showing the angled locking tab locked into position in the matching angled slot.
Figure 9:
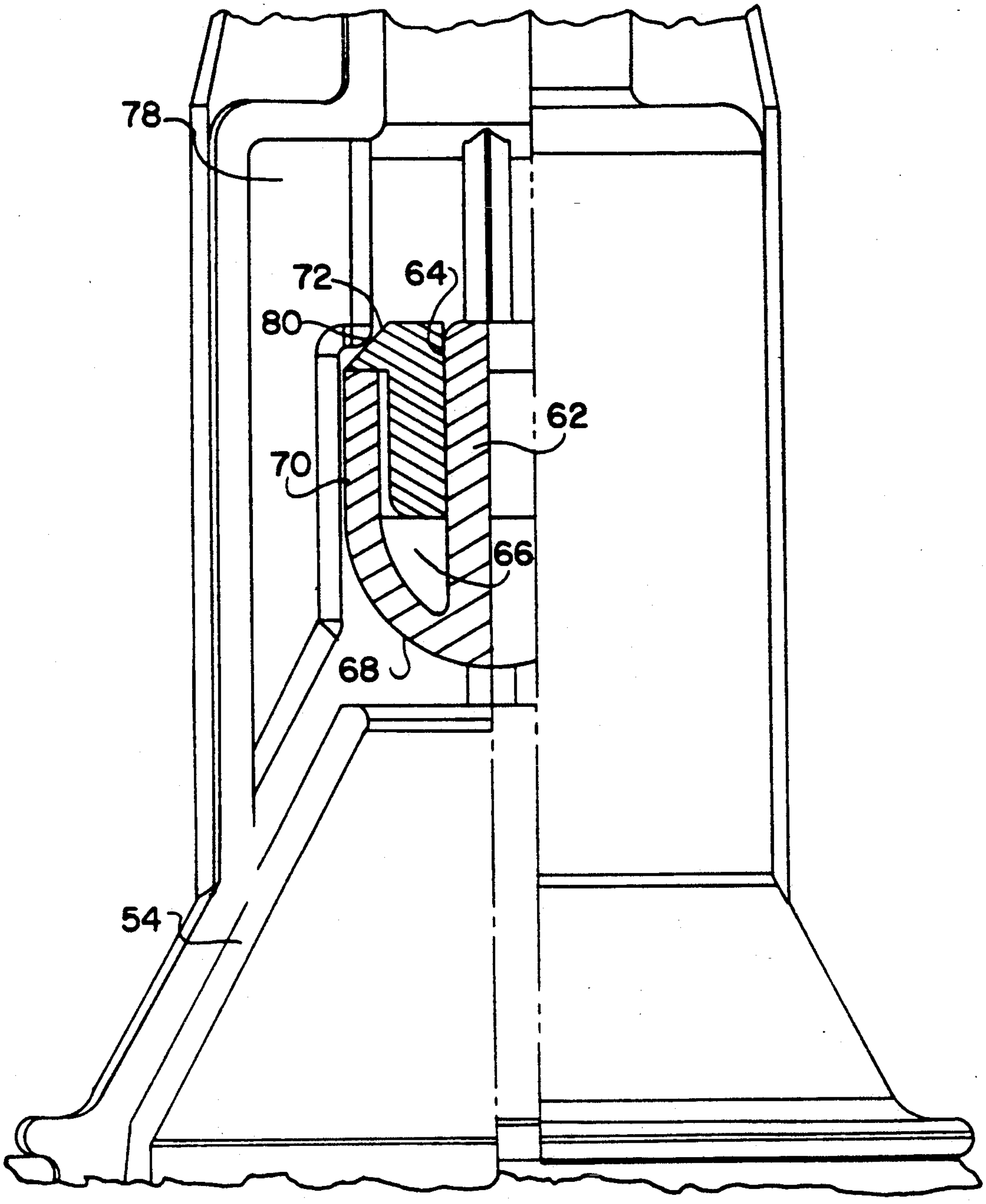
FIG. 9 is a cross-sectional view of the lower contoured gripping tube and check valve assembly showing the check ball assembly in an open position.

The cleaning tube 12 removably connects to either a contoured gripping tube 26 or extension tube 28. One or more extension tubes 28 may be used to permit the user to operate the aquarium cleaning apparatus in larger aquariums without immersing the user's hands in aquarium water. A contoured gripping tube 26 and extension tube 28 include a neck 30 which telescopically connects to the collar 32 of either the cleaning tube 12 or another extension tube 28. As shown in FIG. 5, the collar 32 has a pair of angled slots 34*a*, 34*b* and the neck 30 has a pair of angled locking tabs 36*a*, 36*b*. Locking tab 36*b* is provided at an angle relative to locking tab 36*a*. As shown in FIGS. 6 and 8, the angled locking tabs 36*a*, 36*b* are of a sufficient size and shape to engage the angled slots 34*a*, 34*b*, respectively, by moving into a locked position via a locking notch 37. As shown in FIG. 7 when the angled slots 34*a*, 34*b* and locking tabs 36*a*, 36*b* are in a locked position, the lips 38, 40 of the neck 30 and collar 32 respectively are substantially in contact with each other and the distance between the entrance port 44 of the contoured gripping tube 26 or extension tube 28 and exit port 18 is substantially equal to the thickness of the screen 14. At the exit port 18, there is a screen seat 46 which is a step formed between the inner surfaces of the exit port 18 and collar 32. The screen 14 rests upon the screen seat 46 and is held in that position primarily by the screen snap fit ring 45 and secondarily by the entrance port 44 of the contoured gripping tube 26 or extension tube 28. The extension tube 28 has a step 47 and screen snap fit ring 49 identical to the screen seat 46 and screen snap fit ring 45 of the cleaning tube 12 to provide an alternate location for the screen 14.

Figure 11:
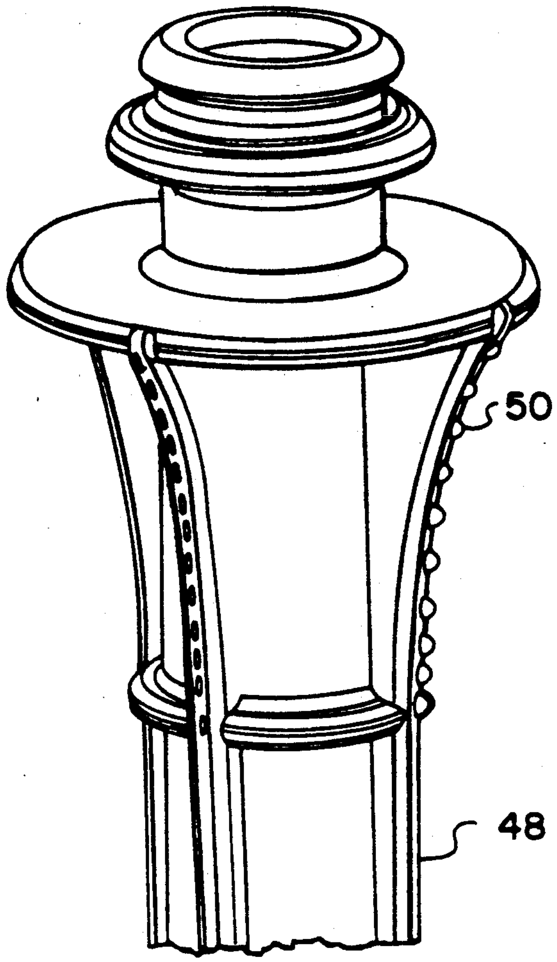
FIG. 11 is an isometric view of the upper portion of the contoured gripping tube showing the contoured ribs and dimples.

Referring to FIGS. 1 and 11, the contoured gripping tube 26 includes four contoured ribs 48. Each rib 48 includes a series of dimples 50 for improved gripping of the aquarium cleaning apparatus by the user. The ribs 48 also provide additional strength and an aesthetically attractive design for the contoured gripping tube 26. The ribs 48 extend outwardly from the outer surface of the contoured gripping tube 26 and have less height along their mid-portions than along their ends. The appearance of the ribs 48 results in a different exterior surface configuration than that presented by the cleaning tube 12. As seen in FIG. 4, for example, the gripping tube 26 has widths along substantial portions of its length that are smaller than any width of the cleaning tube 12.

Referring to FIGS. 1, 8, 9 and 10, a check valve assembly 52 removably connects to the base of the contoured gripping tube 26. The removability of the connection, coupled with the accessibility of the location of the check valve assembly 52 in the base of the contoured tube 26, together permit the repair and/or replacement of the check valve assembly 52. The check valve assembly 52 includes a check ball seat 54 and check ball assembly 56. The check ball assembly 56 includes an upper check ball member or section 58 and lower check ball member or section 60 which snap fit together by means of a center post or first connector 62 extending from a surface in the lower check ball member 60 and a center shaft or second connector 64 in extending from a surface the upper check ball member 58. The center shaft 64 has substantially the same diameter as the center post 62. The upper and lower check ball members 58, 60 are composed of any type of commercially available, moldable polymers, elastomers or rubbers which can produce upper and lower check ball members 58, 60 having a density that produces specific gravity relative to water greater than or substantially equal to about 1.0. The density, however, must be low enough to enable the siphoned water to lift the check ball assembly 56 off the check ball seat 54 or else the check ball assembly will prevent water from being siphoned by the aquarium cleaning apparatus.

The novel two-piece check ball assembly 56 is significantly less expensive than a molded one-piece plastic check ball employed in prior art self-starting mechanisms for the reason that the check ball assembly 56 does not need to be subjected to a tumbling process to remove a parting line. The check ball assembly's two piece construction further prevents warpage of the surface of the spherical section 68 by allowing "coring-out" in the molding process and thereby improves the integrity of the water-tight seal between the check ball assembly 56 and the check ball seat 54. The two-piece configuration, however, will not operate properly if air is entrapped in the void spaces 66 within the check ball assembly 56. To obtain the desired density or buoyancy of the check ball assembly 56, when the upper and lower check ball members 58, 60 are assembled, a material with a specific gravity relative to water greater than or substantially equal to about 1.0 is inserted in the void spaces 66 to give the check ball assembly a negative buoyancy in water. In a preferred embodiment the check ball assembly 56 is assembled underwater to fill the void spaces 66 with water and not air. The assembled check ball assembly 56 includes a spherical section 68 for forming a water-tight seal with the check ball seat 54, a cylindrical section 70 for guiding the movement of the check ball assembly 56, and an angled section 72 for reducing flow disturbance caused by water moving past the check ball assembly 56.

As shown in FIG. 7, the check ball seat 54 snap fits into the base of the contoured gripping tube 26 by means of a check ball seat snap fit ring 74. Referring again to FIGS. 1, 8, 9 and 10, the check ball seat includes a center hole 76 having a diameter less than the approximately ½-inch diameter of the spherical section 68 of the check ball assembly 56. The interior surface of the center hole 76 is rounded to match the outer surface of the spherical section 68 of the check ball assembly 56 to ensure a water-tight seal when the check ball assembly 56 is seated on the check ball seat 54. The contoured gripping tube 26 has four guide members 78 with steps 80 to guide the movement of the cylindrical section 70 of the check ball assembly 56 and prevent the check ball assembly 56 from migrating too far up the contoured gripping tube 26 or rotating such that the seal between the spherical section 68 and check ball seat 54 is not water-tight. If the upward movement of the check ball assembly 56 is too great, the check valve assembly 56 will be unable to self-start the siphon action due to the reduced ability of the check valve assembly 56 to trap water in the upper portion of the contoured gripping tube 26. The integrity of the water-tight seal between the 25 spherical section 68 and check ball seat 54 may be disrupted, for example, by the contact of the cylindrical section 70 of the check ball assembly 56 with the check ball seat 54. The guide members 78 project into the conduit 79 of the contoured gripping tube 26 such that the horizontal cross-sectional area of the conduit 79 is greater than the horizontal cross-sectional area of the cylindrical section 70 of the check ball assembly 56 which is in substantial contact with the guide members 78. The difference in cross-sectional areas enables siphoned water to lift and flow around the check ball assembly 56.

Figure 12:
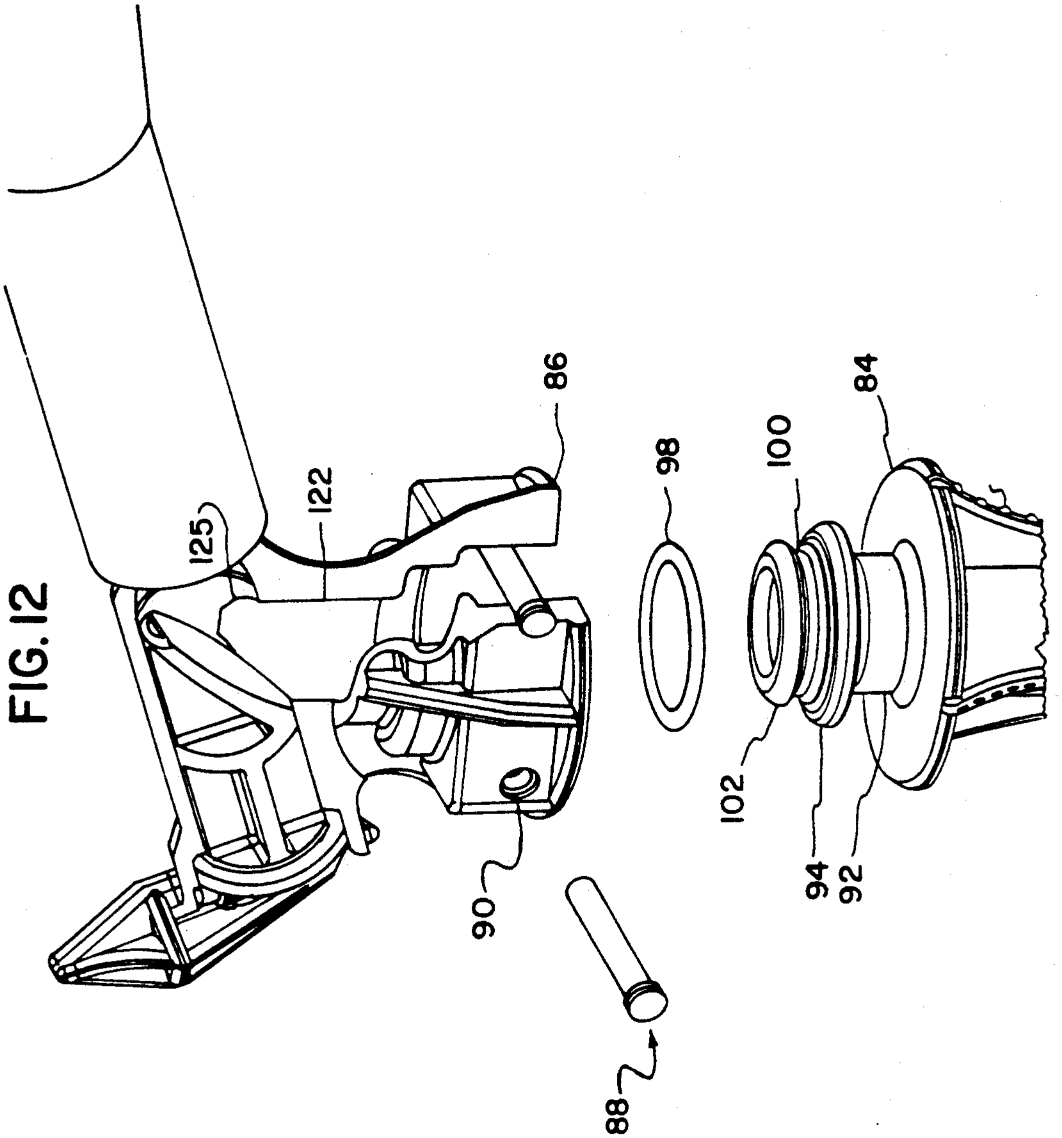
FIG. 12 is an isometric view of the upper portion of the contoured gripping tube and a cross-sectional view of the lower portion of the swivel head assembly showing the fluid control assembly in an open position.
Figure 13:
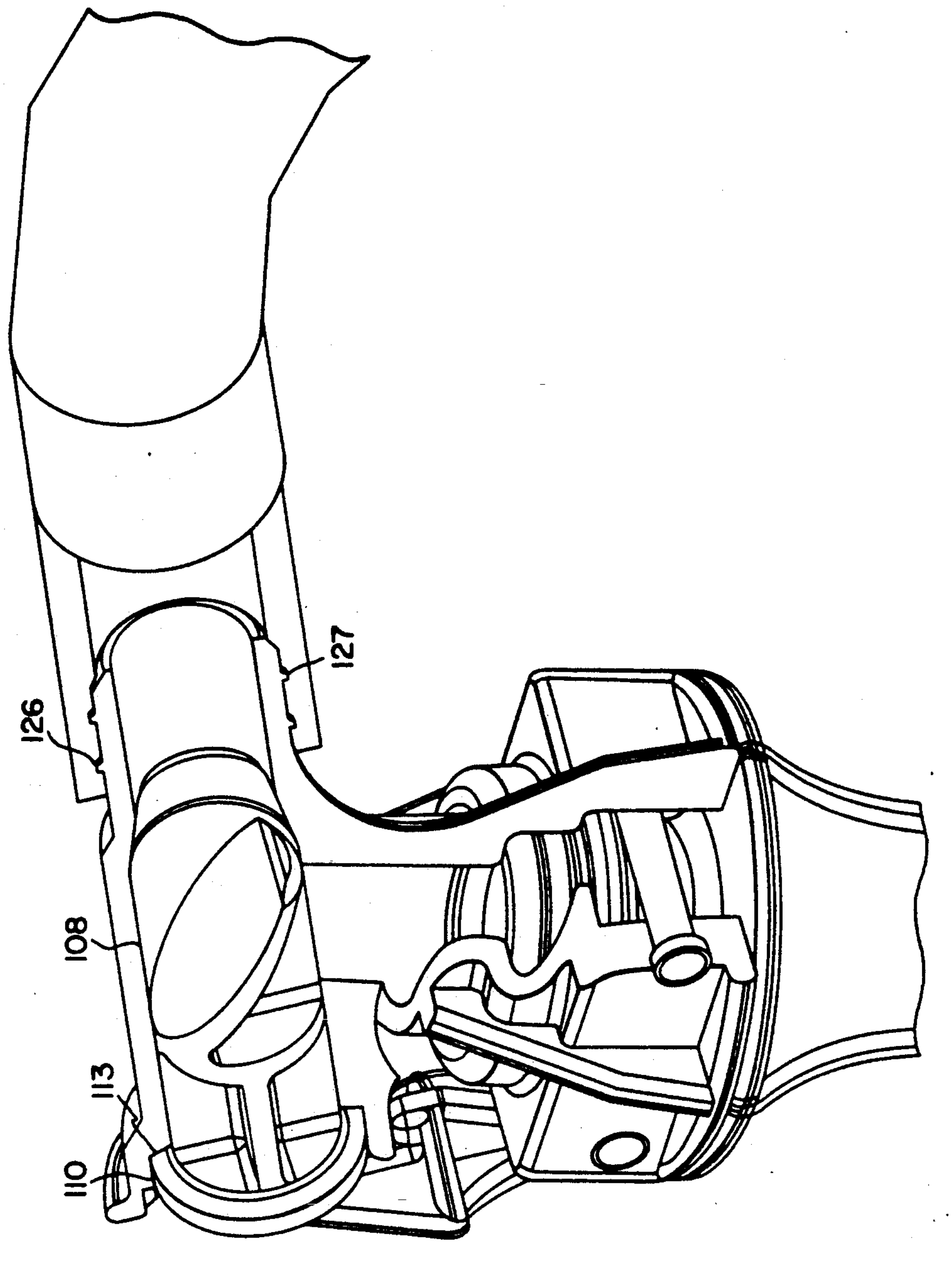
FIG. 13 is a cross-sectional view of the swivel head and fluid control assemblies showing the fluid control assembly in a closed position.

Referring to FIGS. 1, 12 and 13, contoured gripping tube 26 connects to swivel head assembly 82. Contoured gripping tube 26 has a flanged member 84 upon which the swivel head base 86 rotates. The swivel head assembly 82 is connected to the contoured gripping tube 26 by two mounting pins 88 which are inserted into holes 90 such that the space between the mounting pins 88 is substantially equal to the outer diameter of the swivel head guide 92. The pins are prevented from moving vertically by the swivel head retainer ring 94. In this manner, the swivel head assembly 82 can rotate upon the flanged member 84 to maintain the desired orientation of the siphon hose 96 and thereby prevent flow impediments or stoppages caused by kinking or pinching of the siphon hose 96 as the aquarium cleaning apparatus is repositioned in the aquarium. To prevent leakage of water between the swivel head assembly 82 and flanged member 84 an O-ring 98 fits into the O-ring seat 100 and is held in place by the O-ring retainer 102. The O-ring 98 is in substantial contact with the swivel head assembly 82 to form a water-tight seal.

The swivel head assembly 82 has an angled spout 104. The angle between the longitudinal center line of the angled spout 104 and the horizontal is about 10 degrees. Unlike prior art devices which typically had a greater than 10° angle between the horizontal and siphon hose junction, the angled spout 104 facilitates self-starting of the siphon action. Compared to prior art devices, the present invention requires a lower head of water to initiate the siphon action (e.g., the present invention does not have to lift the water as high as prior art devices).

Figure 14:
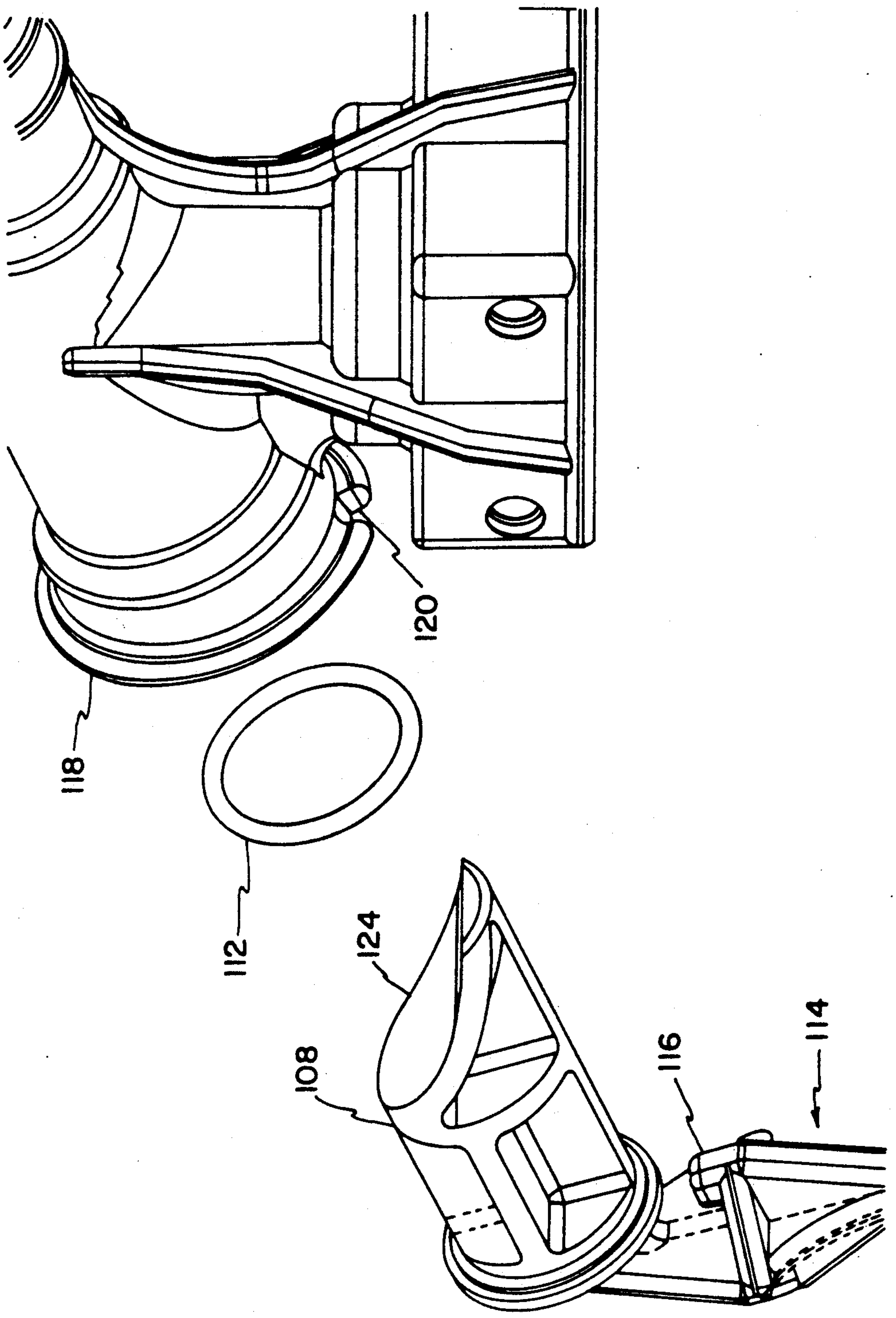
FIG. 14 is an isometric view of the swivel head assembly, second 0-ring, and fluid control assembly showing the notch in the fluid control assembly guide which enables the fluid control assembly to engage the fluid control assembly guide.

The fluid control assembly 106 connects to the swivel head assembly 82. The swivel head assembly 82 has a first conduit 108 and second conduit 110 with the second conduit 110 having a smaller inner diameter than the first conduit 108. The difference between the inner diameters is substantially equal to the thickness of a second O-ring 112. The fluid control assembly 106 includes a rotatable channel member 108 that fits inside the first and second conduits 108, 110 with a diameter substantially equal to the diameter of the second conduit 110. The second O-ring 112 fits in the step 113 located at the juncture between the first and second conduits 108, 110 to maintain a water-tight seal between the swivel head assembly 82 and fluid control assembly 106. The fluid control assembly 106 also includes a control arm 114 which has a finger 116 that straddles the fluid control assembly guide 118 and holds the channel member 108 inside the swivel head assembly 82. As shown in FIG. 14, the finger 116 straddles the fluid control assembly guide 118 by means of a notch 120. The suction on the channel member 108 caused by the siphon action of the present invention and the friction between the second 0 ring 112 and first conduit 108 together hold the channel member 108 inside the swivel head assembly 82 if the finger 116 is aligned with the notch 120.

Referring again to FIGS. 1, 12 and 13, the swivel head assembly 82 includes a third conduit 122 for the passage of water. The channel member 108 has a hydraulic ramp 124 which may be rotated by means of the control arm 114 to various positions to obtain a desired rate of flow by decreasing the cross-sectional area of flow through the orifice 125. For example, as shown in FIG. 12 rotating the channel member 108 to face upwardly causes the flow to increase to a maximum level and as shown in FIG. 13, rotating the channel member 108 to face downwardly causes the flow to decrease and eventually cease altogether. The hydraulic ramp 124 improves flow dynamics by decreasing the resistance to flow caused by the abrupt change in flow direction from the third conduit 122 to the second conduit 110.

Finally, the swivel head assembly 82 includes first and second hose grippers 126, 127 each of which has a triangular profile to grip more firmly the flexible siphon hose 96, maintain a water-tight seal, and prevent separation of the siphon hose 96 from the aquarium cleaning apparatus. The other end of the siphon hose 96 discharges into a container which may later be used to dispose of the siphoned materials. As shown in FIG. 1, the inner diameters of the cleaning tube 12 and extension tube 28 are greater than that of the siphon hose 96.

Figure 15:
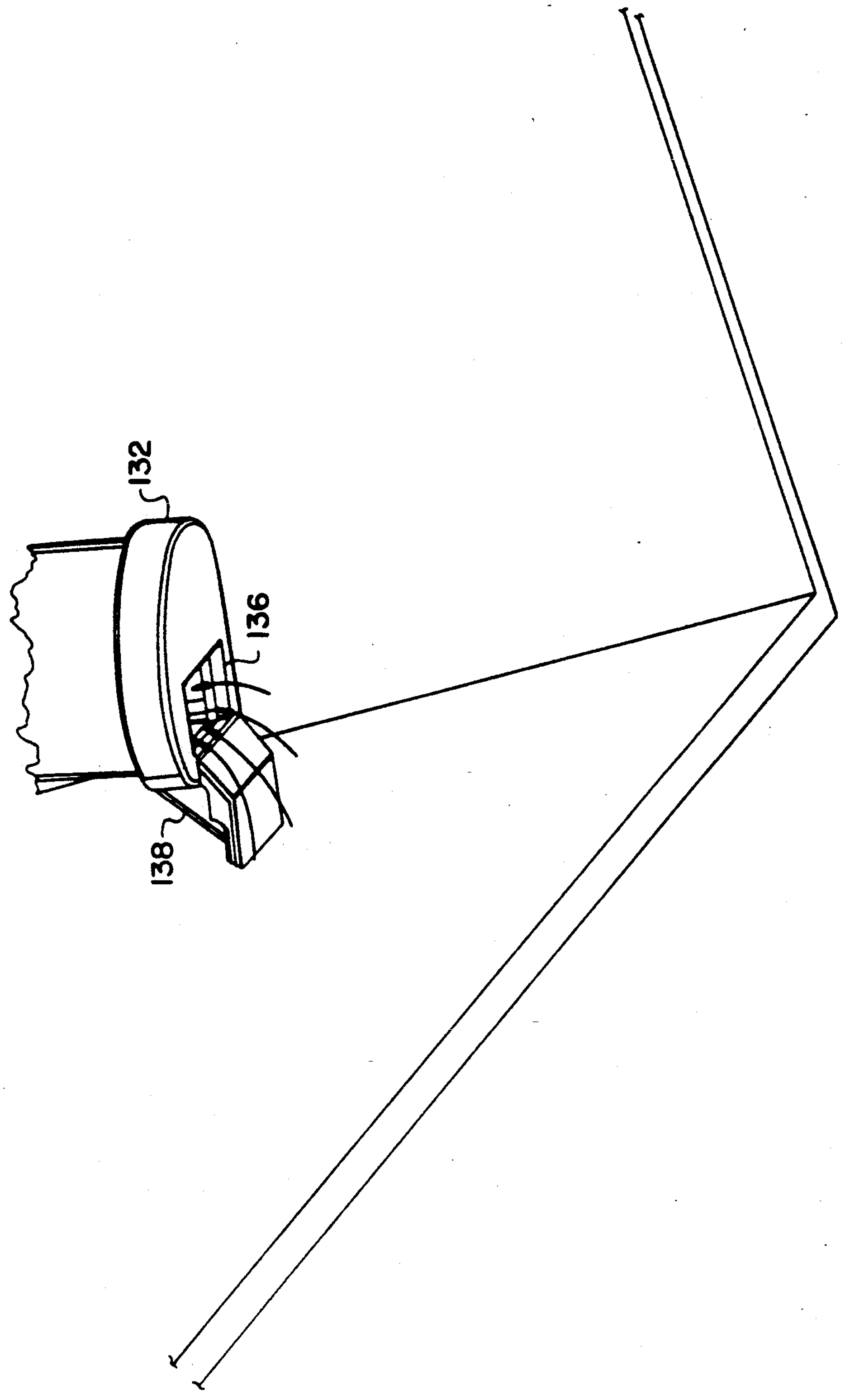
FIG. 15 is a perspective view of the aquarium cleaning apparatus illustrating the use of the scraper assembly.

Referring to FIGS. 1 and 15, a scraper assembly 128 may be removably attached to the cleaning tube 12 to remove deposits which accumulate upon the interior surface of an aquarium. The scraper assembly 128 firmly attaches to the cleaning tube 12 by means of a support block 130 and a sleeve 132. The outwardly facing surface of the support block 130 has substantially the same shape as and contacts the inner surface of the cleaning tube 12. The inner surface of the sleeve 132 has substantially the same shape as and contacts the outwardly facing surface of the cleaning tube 12. That is, the sleeve 132 includes substantially straight sides 131, 133 and these sides engage the sides *23a, 23b* and legs *25a, 25b*, respectively, of the angled section 22. The scraper assembly also includes a scraper blade 134 having a scraping edge 135 which is composed of a material which will not scratch the walls of the aquarium and an intake port 136 to permit water to be siphoned into the cleaning tube 12 when the scraper assembly 128 is in use. The scraper assembly 128 has support members 138 to prevent separation of the scraper blade 134 from the scraper assembly 128 during use. When the scraper assembly 128 is attached to the cleaning tube 12, the scraper blade 134 extends substantially parallel to the free end 16 of the cleaning tube 12 and substantially perpendicular to the length of the cleaning tube 12. As will be known and understood by those skilled in the art, the angle between the horizontal and the scraper blade 134 may range from about 0° to about 90° with the preferred angle ranging from about 0° to about 45°.

Figure 16:
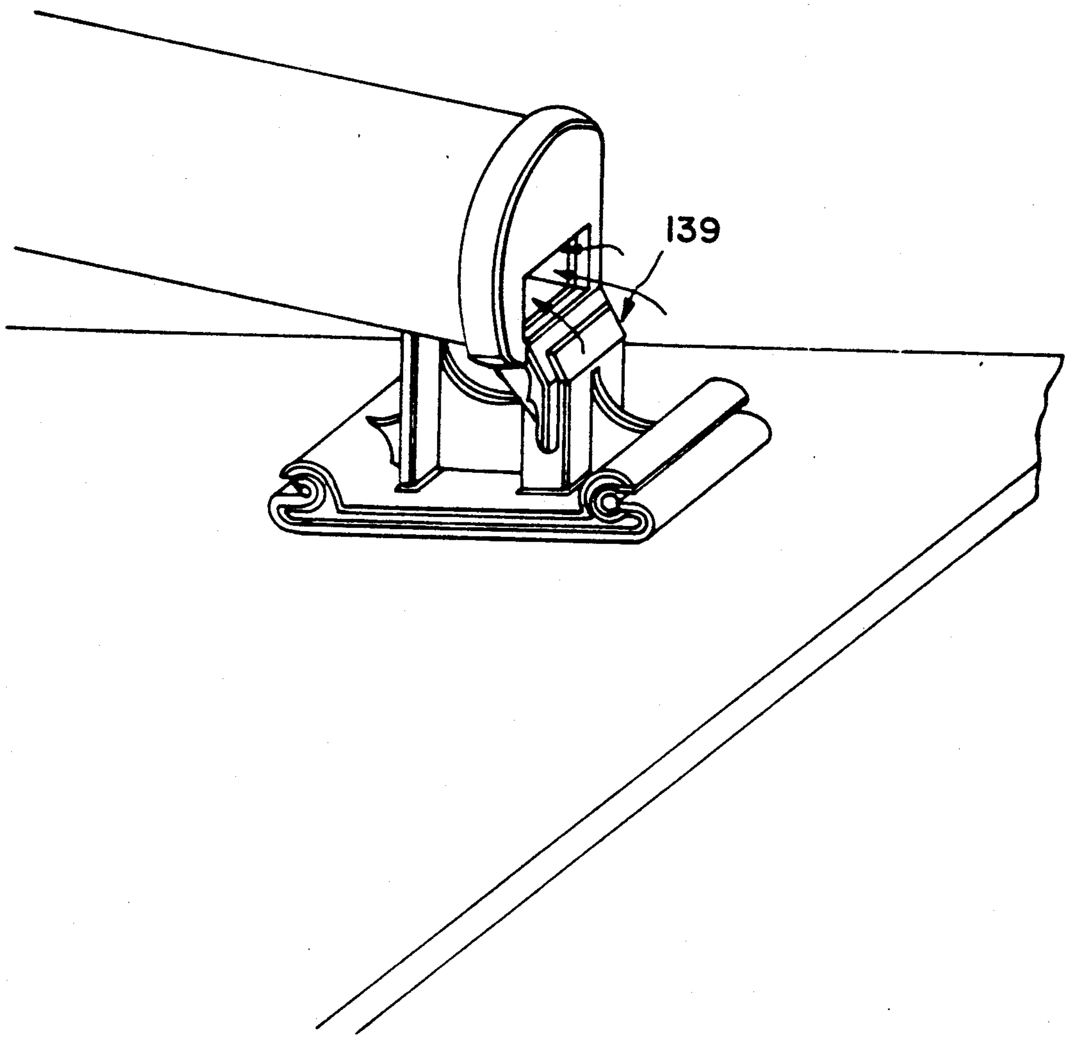
FIG. 16 is a perspective view of the aquarium cleaning apparatus showing the use of the scrubber assembly.

Referring to FIGS. 1 and 16, a scrubber assembly 138 removably connects to the scraper assembly 128. The scraper assembly 128 snap fits into the scraper retaining member 139. A support arm 140 on the scrubber assembly 138 enables the user to apply pressure to the scrubber assembly 138 during operation. The greater the pressure asserted against the support arm 140, the more strongly the scraper retaining member 139 grips the scraper assembly 128. Each end of an appropriately sized cleaning or scrubbing pad 142 may be mounted on a body 141 of the scrubber assembly 138 by means of holding pins 144 and retaining channel 146. The cleaning pad 142 is placed between the holding pin 144 and the retaining channel 146 and held in place during operation by the pressure exerted by the holding pin 144 against the cleaning pad 142 and retaining channel 146. The cleaning pad 142 may be any non-rusting, non-corrosive material substantially capable of removing deposits from the interior surface of an aquarium without scratching the surface of the aquarium. The foregoing aquarium cleaning apparatus can be made of any moldable polymer known in the art so long as the material is non-rusting, non-corrosive and non-toxic to fish, plants, and invertebrates.

Figure 3:
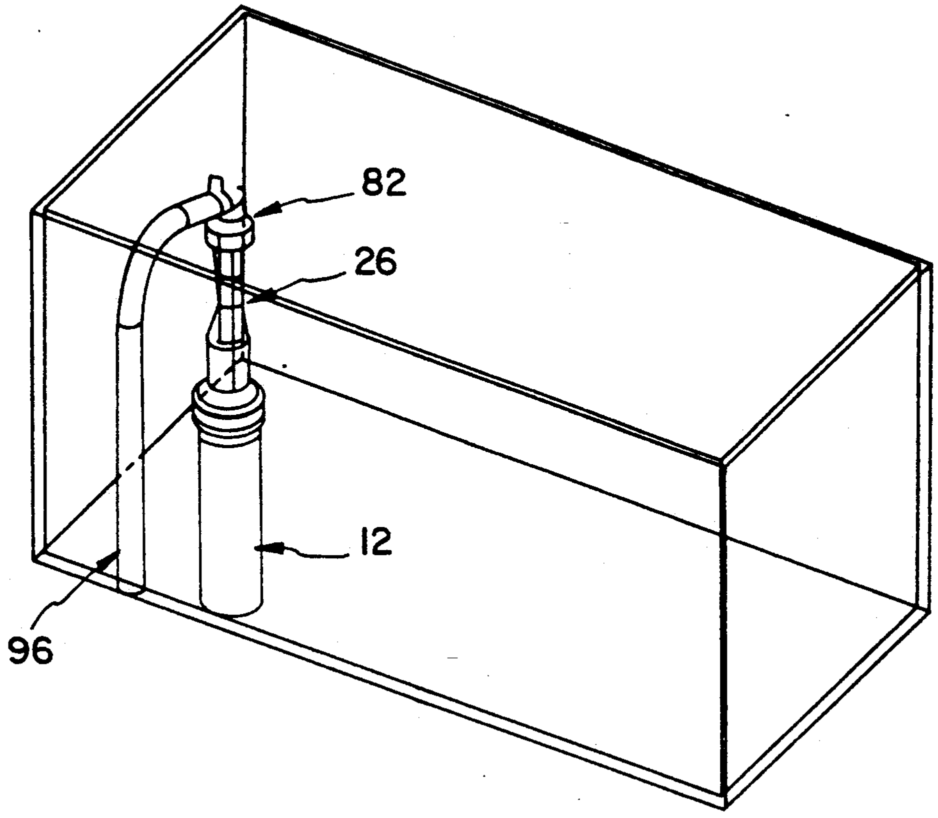
FIG. 3 is an isometric view of an aquarium cleaning apparatus showing the use of the cleaning tube assembly to clean gravel adjacent to the walls of an aquarium.

The manner of using the aquarium cleaning apparatus will now be described. As shown in FIG. 3, the cleaning tube assembly 10 and check valve assembly 52 are submerged in the aquarium water and the aquarium cleaning apparatus is then moved in an up-and-down motion using short, rapid strokes to permit air to escape through the check valve assembly 52 and accumulate sufficient water above the check valve assembly 52 to start the siphon action. When the siphon action commences, the entrance port 16 on the cleaning tube assembly 10 is inserted below gravel level causing the gravel to be churned, e.g., pulled into the cleaning tube 12, and fish waste and other sediments to be carried with siphoned water into the cleaning tube assembly 10. To prevent gravel from also being carried with the siphoned water into the screen 14, the flow rate may be adjusted by rotating the fluid control assembly 106 to achieve a flow rate that is low enough to cause the gravel to fall back to the floor of the aquarium but high enough to pull waste and other sediments away from the gravel. If desired, the present invention may be used to relocate gravel in the aquarium by pulling the gravel into the cleaning tube 12 by maintaining a high rate of flow, moving the cleaning tube 12 to the desired location, lowering the rate of flow, and replacing the gravel to the floor of the aquarium as manipulated.

Water and sediments pass through the cleaning tube assembly 10 and are introduced into the contoured gripping tube 26. The water suction lifts the check ball assembly 56 off of the check seat 54 permitting the water and sediments to pass around the check ball assembly 56, through the contoured gripping tube 26, and into the swivel head assembly 82. Water and sediments are redirected by the hydraulic ramp 124 towards the siphon hose 96. The channel member 108 may be rotated by means of the control arm 114 to vary the area of orifice 125 through which water and sediments can flow. If the channel member 108 is rotated to an upwardly facing position to stop the flow of water and sediments, the flow may be reinitiated by rotating channel member 108 to enable water to flow through all or part of the orifice 125. The water and sediments flow through the siphon hose 96 and discharge into a container such as a bucket for later disposal.

When the gravel accessed by the cleaning tube 12 is clean, the aquarium cleaning apparatus is moved to other locations until the desired amount of aquarium gravel is substantially free of fish waste and other sediments. The fluid control assembly permits the siphon action to be stopped during repositioning and restarted when the aquarium cleaning apparatus is at the desired location. As the aquarium cleaning apparatus is moved around the aquarium, the swivel head assembly 82 rotates to prevent flow stoppages or impediments caused by kinking or pinching of the siphon hose 96.

FIGS. 3 and 4 illustrate the use of the angled section to remove fish waste and other sediments from aquarium gravel located adjacent either to aquarium walls or aquarium corners. The angled section 22 effectively removes waste and other sediments from gravel located adjacent to aquarium corners not only in rectangular aquarium tanks but also in other aquarium tank configurations, including hexangular aquarium tanks.

Referring to FIG. 15, after the gravel cleaning function is completed, the scraper assembly 128 may be attached to the cleaning tube 12 to remove deposits on the interior surface of the aquarium. After attachment of the scraper assembly 128, the siphon action is reinitiated and the scraper assembly 128 is moved in a vertical motion with the scraper blade 134 contacting the aquarium surface. The greater length and rigidity of the aquarium cleaning apparatus compared to prior art devices provide greater leverage and strength when scraping aquarium surfaces. Unlike prior art cleaning devices, as deposits are removed from aquarium surfaces, the deposit material enters the cleaning tube 12 through the intake port 136 and do not cloud aquarium waters.

Referring to FIG. 16, when deposits are substantially removed from the interior surfaces of the aquarium by the scraper assembly 128, a scrubber assembly 138 may be attached to the scraper assembly 128. The siphon action is then reinitiated and the scrubber assembly 138 is moved in a vertical motion with the cleaning pad 142 contacting the aquarium surface to remove deposits not removed by the scraper assembly 128. Like the scraper assembly 128, materials removed by the scrubber assembly 138 enter the cleaning tube 12 through the intake port 136 and do not cloud aquarium waters.

In light of the above discussion of the preferred embodiment, a number advantages of the present invention are apparent. First, the angled section 22 permits more efficient cleaning of gravel adjacent to the walls and corners of an aquarium as well as aquarium decorations. Second, the screen 14 prevents gravel from jamming the check valve assembly 52 or harm to fish. Third, the check valve assembly 52 and extension tube 2 enable the siphon action to be commenced in most commercially available aquariums regardless of size without requiring the user to immerse his hands in aquarium water or risk ingestion of dirty aquarium water, thereby avoiding the consequential water spillage normally associated with priming prior art aquarium cleaners. The check valve assembly 52 also permits self-starting of the siphon action in hexagonal and octagonal tanks which typically have insufficient space to start prior art siphon-based aquarium cleaners. Fourth, the configuration of the contoured gripping tube 26 is more aesthetically attractive than prior art cleaners and improves the ability of the user to grip the aquarium cleaning apparatus during operation. Fifth, the novel two-piece design of the check ball assembly 56 prevents a parting line from contacting the check ball seat 54 and thereby destroying the integrity of the seal between the check ball assembly 56 and the check seat 54. Sixth, the two-piece construction of the check ball assembly 56 makes the check ball assembly 56 significantly cheaper than prior art check balls used in aquarium cleaners having a self-starting feature. Seventh, the swivel head assembly 82 permits the siphon hose 96 to be rotated to prevent flow stoppages or impediments caused by kinking or pinching of the siphon hose 96. Eighth, the angled spout 104 on the swivel head assembly 82 is at the optimal angle for initiating the siphon action through a self-starting mechanism. Ninth, the fluid control assembly 106 permits the flow rate to be adjusted with finger tip control to prevent unnecessary drainage of the aquarium during cleaning and the gravel from clogging the screen 14. Tenth, the hydraulic ramp 124 increases flow dynamics and facilitates self-starting. Eleventh, the scraper and scrubber assemblies 128, 138 attach to the cleaning tube 12 and thereby enable both gravel and the interior surfaces of the aquarium to be cleaned with the same device. Use of the scraper and scrubber assemblies 128, 138 with the aquarium cleaning apparatus further prevents the clouding of aquarium waters normally caused by the use of conventional aquarium surface cleaners. Twelfth, the placement of the scraper and scrubber assemblies 128, 138 on the aquarium cleaning apparatus provides greater leverage and strength than prior art aquarium surface cleaners. Finally, the cleaning tube assembly 10 is removable enabling the cleaning and replacement of the check valve assembly 52 and screen 14.

Although the present invention has been described with reference to certain embodiments, it should be appreciated that further modifications can be affected within the spirit and scope of the invention.

What is claimed is:

1. An apparatus for cleaning an aquarium having walls and corners where walls intersect, comprising:

a fluid carrier assembly for siphoning substances form an aquarium, said fluid carrier assembly including a first fluid carrying member having a free end, said free end having a first section and a second section, said first section being defined by two adjoining legs and a semi-circular section wherein each of said legs is substantially straight and with a substantially straight edge being defined at their juncture and connected at their non-intersecting edges by said semi-circular section, said substantially straight edge extending along a length of said first fluid carrying member, each of said legs being part of one of two planar surfaces, wherein said straight edge is substantially parallel to a corner of adjoining walls of the aquarium and said planar surfaces are substantially parallel to the adjoining walls during a cleaning operation wherein said substantially straight edge is positionable at the juncture between the aquarium walls in order to clean gravel adjacent to aquarium walls and corners; and a head assembly connected to said fluid carrier assembly, said head assembly for receiving fluid from said first fluid carrying member in order to remove fluid from the aquarium.

2. An apparatus, as claimed in claim 1, wherein:

said head assembly includes means for allowing rotation thereof relative to said fluid carrier assembly, said means for allowing including means for preventing movement in a substantially vertical direction of remaining portions of said means for allowing when the apparatus is being used to siphon fluid from the aquarium.

3. An apparatus, as claimed in claim 1, wherein:

said fluid carrier assembly includes a second fluid carrying member removably connected to said first fluid carrying member, said fluid carrier assembly further including means for interconnecting said first and second fluid carrying members, said means for interconnecting including angled slots formed adjacent an end of one of said first and second fluid carrying members and tab means provided on the other of said first and second fluid carrying members, said tab means including a first tab and a second tab with said first tab being disposed at an angle relative to said second tab wherein cooperating contact occurs between said angled slots and said tab means when said first and second fluid carrying members are connected together.

4. An apparatus, as claimed in claim 1, wherein:

said fluid carrier assembly includes a check valve assembly, said check valve assembly including a check ball having first and second sections, said first section having first interconnecting means connected to a surface thereof and extending outwardly therefrom and said second section having second interconnecting means connected to a surface thereof and extending outwardly therefrom, said check valve assembly further including a material for replacing displacing air that is present in said first and second sections, said first and second sections being joined together by said first and second means for interconnecting wherein immediately after joining said first and second sections together, said first and second sections are joined together forming a circumferential juncture which is substantially smooth to permit proper operation of said check ball when fluid is siphoned from the aquarium.

5. An apparatus, as claimed in claim 4, wherein said first section is substantially a spherical section and said second section is substantially a cylindrical section and said material displacing air in said first and second sections has a specific gravity relative to water greater than or substantially equal to about 1.0.

6. An apparatus, as claimed in claim 1, wherein:

said first fluid carrying member is a single tube in which all fluid flow is in only one direction during siphoning and said fluid carrier assembly further includes at least one filtration member that is substantially impermeable to the passage of substantially all sizes of aquarium gravel, said one filtration member being held in a part of said single tube.

7. An apparatus, as claimed in claim 1, wherein:

said head assembly includes:

a spout having an orifice that is in fluid flow communication with said first fluid carrying member;

a channel member disposed in said spout for positioning relative to said orifice in order to control fluid flow through said orifice; and a control arm connected to said channel member for rotating said channel member to a selected one of a number of positions relative to said orifice, said orifice, said channel member and said control arm for controlling the flow of substances through said fluid carrier assembly.

8. An apparatus, as claimed in claim 1, wherein:

said fluid carrier assembly includes scraper means for cleaning the interior surface of the aquarium, said scraper means including a sleeve having substantially straight first and second sides with each of said first and second sides being connected adjacent to one of said two legs defined at said free end of said first fluid carrying member, said scraper means further including a scraper blade connected to said sleeve with said scraper blade extending away from said sleeve and being substantially parallel to said free end of said first fluid carrying member and substantially perpendicular to the length of said first fluid carrying member, said scraper blade including a scraping edge for engaging walls of the aquarium.

9. An apparatus, as claimed in claim 1, wherein:

said fluid carrier assembly includes scrubber means for cleaning the interior surface of the aquarium, said scrubber means including:

a body;

a scrubbing pad overlying a surface of said body; and holding means for removably holding said scrubbing pad to said body.

10. An apparatus, as claimed in claim 1, wherein:

said fluid carrier assembly includes a second fluid carrying member having curved ribs extending outwardly form an outer surface of said second fluid carrying member and in which said curved ribs have less height along mid-portions of said second fluid carrying member then along ends thereof.

11. An apparatus for cleaning an aquarium, comprising:

a first fluid carrying member having a free opened end for initially receiving siphoned fluid from the aquarium;

a second fluid carrying member in fluid communication with said first fluid carrying member with said second fluid carrying member receiving siphoned fluid from said first fluid carrying member;

first means for interconnecting said first and second fluid carrying members; and second means for use in controlling and directing the flow of fluid through said first and second fluid carrying members, said second means including at least one of the following assemblies:

a check ball assembly including first and second check ball sections with said check ball sections having means for interconnecting said first and second sections together, said check ball assembly further including a material located in said connected check ball sections for displacing air with said material having a specific gravity of at least 1.0 relative to the specific gravity of water, wherein an outer surface juncture of said first and second check ball section is substantially smooth after joining said two check ball sections together wherein removal of a parting line is avoided;

a swivel assembly operatively connected to said second fluid carrying member with said swivel assembly being rotatable relative to said second fluid carrying member, said swivel assembly including means for preventing movement in a substantially vertical direction of remaining portions of said swivel assembly during rotation when the apparatus is positioned for siphoning fluid from the aquarium wherein a siphon hose can be moved as a result of rotation of said swivel assembly during a siphoning operation; and a flow control assembly including a spout having an orifice in flow communication with said second fluid carrying member, a channel member disposed in said spout for controlling the amount of fluid through said orifice, a control arm operatively connected to said channel member for using in rotating said channel member in said spout to control fluid flow through said orifice into said spout and sealing means connected to said channel member for preventing fluid leaks from said spout.

12. An apparatus, as claimed in claim 11, wherein:

said second fluid carrying member has widths along substantial portions of its length that are smaller than any width of said first fluid carrying member and said second fluid carrying member has a different exterior surface configuration than the exterior surface configuration of said first fluid carrying member.

13. An apparatus, as claimed in claim 11, wherein:

said first means includes angled slots formed adjacent one end of one of said first and second fluid carrying members and tab means protruding from the other of said first and second fluid carrying members adjacent its end with said tab means being received by said angled slots for interconnecting said first and second fluid carrying members together.

14. An apparatus, as claimed in claim 11, further including:

cleaning means connected adjacent to said free end of said first fluid carrying member, said cleaning means including a scraper assembly having a scraper blade extending substantially parallel to said free end of said first fluid carrying member and scrubbing means having a removable scrubbing pad, said scrubbing means being connected to said scraper blade during cleaning of the aquarium using said scrubbing pad.

15. An apparatus, as claimed in claim 11, wherein:

said means for preventing of said swivel assembly includes a flange member, at least a first mounting pin located adjacent to said flange member and a retainer ring for preventing vertical movement of said first mounting pin.

* * * * *